Reissued Dec. 4, 1945

Re. 22,700

UNITED STATES PATENT OFFICE 22,700

DEVITALIZING COMPOSITION OF MATTER

Paul Müller, Basel, Switzerland, assignor to the firm J. R. Geigy A. G., Basel, Switzerland No Drawing. Original No. 2,329,074, dated September 7, 1943, Serial No. 381,763, March 4, 1941. Application for reissue July 16, 1945, Serial No. 605,431

5 Claims. (Cl. 167—30)

This invention relates to insecticides.

For combatting insects of all kind such as flies, stinging flies, moths, beetles, plant-lice and so on, there are mostly used petroleum solutions of pyrethrine or rotenone or aqueous emulsions of such compounds. Nicotine is, in spite of its poisonous character, also used for the protection of plants, but it cannot be used in inhabited rooms.

Both the first mentioned agents show the disadvantage of smelling disagreeably in spite of the admixture of strong perfuming agent, when they are used in form of petroleum solutions. In aqueous emulsions they are however stable only for a short time, as their activity already strongly decreases after a short time.

All experiments for inventing artificial substances acting very rapidly and positively, but being nearly or completely odorless and having no irritating effect upon human beings have given until now no essential result. Thus for example the use of halogenated nitriles, especially of trichloracetonitrile, is limited to uninhabited buildings or to closed receptacles, as these halogenated compounds, even when extremely diluted, irritate very strongly the mucous eye-membrane.

Therefore, it is very surprising that the condensation products of 1 molecule of choral with 2 molecules of certain compounds with replaceable hydrogen from the benzene series, show, beside the sure killing effect on insects, only a very weak and not at all disagreeable odor and do not exert even in finely dispersed form any irritating effect on the mucous membranes of the eyes, nose or throat.

The said compounds correspond to the following general formula

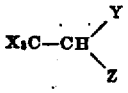

wherein X represents chlorine atoms and Y and Z mean certain aromatic radicals of the benzene series.

The said compounds can be used as powder or, when dissolved or emulsified, in solvents or diluents, but they can also be used together with other inert substances inactive by themselves or in combination with fungicide, bactericide or insecticide agents.

They are very stable in neutral or well as in acid or weakly alkaline solutions and their preparation is technically very simple.

The preparation of the described compounds is known (O. Zeidler, B.7, 1181).

The following example illustrates the present invention. The parts are by weight, unless otherwise stated.

*Example*

By treating, while strongly stirring, a mixture of 2 molecules of benzene or chlorobenzene with one molecule of chloral or chloralhydrate with an excess of concentrated sulfuric acid (of 100 per cent strength) heating takes place after some time, which first increases up to about 60° C. and then slowly decreases again. Stirring is continued until the reaction mass has cooled down to room temperature and contains solid particles. Then it is poured into much water whereby the raw condensation product separates out in a solid form. It is well washed out and, after being recrystallised from alcohol, it is obtained in form of white, fine crystals which show a weakly fruit-odor. The formulae of these compounds are the following ones:

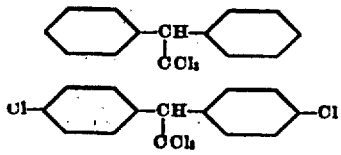

The first compound melts at 64° C., the second one at 103–105° C. (about the preparation see also O. Fischer, B.7, 1191). These two diphenylmethane compounds react surely against flies, by spraying 5 ccm. of an alcoholic solution of 5 per cent strength per cubic metre of room. Death takes place, for flies, within 2 hours; already after 10–15 minutes nearly all flies are so paralyzed that they can no longer fly. Moths, plant-lice or other pests are also destroyed within a very short time by the sprayed compounds. Instead of solutions in alcohol, petroleum or similar solvents one may, in many cases, also use aqueous emulsions. Their efficiency does not thereby decrease even on long storage, which is the case for many known insecticide preparations.

What I claim is:

1. An insecticidal composition of matter comprising the combination of the active ingredient α,α-di(p-chlorophenyl)-β,β,β-trichlorethane of the formula

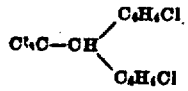

and an insecticidal carrier selected from the group consisting of powder, solvent free from ether, and aqueous emulsion.

2. A contact insecticide comprising the chemical compound α,α-di(p-chlorophenyl)-β,β,β-trichlorethane in the form of powder and a carrier therefor.

3. A contact insecticide comprising a solution of the chemical compound α,α-di(p-chlorophenyl)-β,β,β-trichlorethane in a petroleum solvent.

4. A contact insecticide comprising the chemical compound α,α-di(p-chlorophenyl)-β,β,β-trichlorethane and a carrier therefor consisting of an aqueous emulsion.

5. A contact insecticide comprising a solution of the chemical compound α,α-di(p-chlorophenyl)-β,β,β-trichlorethane in a solvent free from ether.

PAUL MÜLLER.

CERTIFICATE OF CORRECTION.

Reissue No. 22,700. December 4, 1945.

PAUL MÜLLER.

It is hereby certified that error appears in the printed specification of the above numbered patent requiring correction as follows: Page 1, first column, line 31, after "all" insert --a--; line 51, for "or well" read --as well--; and second column, line 25, between the formulae insert the word "and"; line 53, for "insecticidal" read --insecticide--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.